E. J. Riker,
Grapple
Nº 84,510.   Patented Dec. 1, 1868.
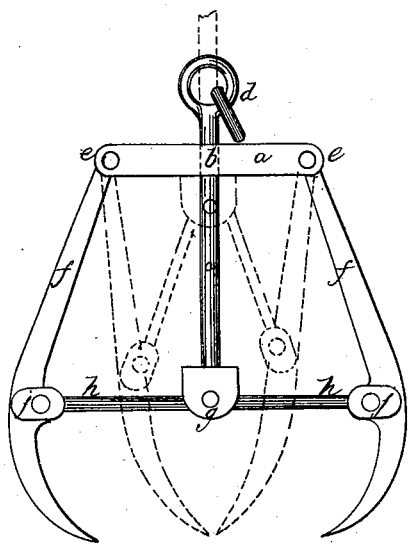
Witnesses:
Wm H Clifford
Henry C Houston
Inventor:
E J Riker

United States Patent Office.

E. J. RIKER, OF LEWISTON, MAINE.

Letters Patent No. 84,510, dated December 1, 1868.

IMPROVEMENT IN GRAPPLING-HOOKS.

The Schedule referred to in these Letters Patent and making part of the same

*To all whom it may concern:*

Be it known that I, E. J. RIKER, of Lewiston, in the county of Androscoggin, and State of Maine, have invented a new and useful Improved Grappling-Hook; and I hereby declare the following to be a full, clear, and exact description thereof, which will enable others to make and use my invention, reference being had to the accompanying drawings, forming part of this specification, in which is shown a side elevation of my invention.

The purpose of my invention is to produce a hook, which closes or grapples by means of its own weight and the weight of the object to be raised, said hook being used in lifting various articles, such as ice and bundles or bales of certain kinds of merchandise.

It is also the object of my invention to produce such a hook with an increased holding-power.

$a$ is a cross-bar, with a hole at $b$ for the rod $c$ to pass upwardly or downwardly.

The rod $c$ has an eye and ring at $d$ for attaching a chain, cord, or rope.

Jointed to the cross-bar $a$, at $e\ e$, are two hooked arms, $f f$, swinging on the pivots $e\ e$.

As illustrated in the drawing, the sliding rod $c$ has a pivot at $g$, to which are jointed arms $h\ h$, which are also jointed to the hooks $f f$ at $j\ j$. When the rod $c$ is drawn upwardly, the arms $f f$ have a tendency to approach each other, as indicated by the dotted lines, at which time the part $g$ of the rod is drawn up to the under side of the cross-bar $a$.

A weight placed between the curved points of the arms $f f$ is grappled by the points at the instant the rod $c$ is elevated at all, and this with great power, because it will be seen that the arms $h\ h$ and rod $c$ form a toggle whose force is exerted directly upon the object to be grappled and raised, at the first instant of raising the rod $c$. When $c$ is released and allowed to drop downwardly, the hooks separate, and the weight can then be easily removed.

Thus, the hook holds the object with great security, and releases it automatically.

It may be observed that with the object to be raised placed between the hooked points of $f f$, they will never approach very near to the position seen in the dotted lines, so that the toggle-power is always exerted to a considerable degree on the weight.

I am aware of John Johnson and William M. Hall's patent for a "hay-loader," No. 63,382, April 2, 1867, but this is different from my invention in construction and operation.

In my invention the hooked arms $f f$ are opened or closed by the same means, viz, the rod $c$ operating the toggle composed of arms $h\ h$.

In the case of the patent above referred to, when the stem is unhooked the fork is opened by its weight resting upon two ropes, which draw it open.

In my invention, the whole, when suspended, hangs from $d$, and then the tendency of the hooked arms $f$ is to close.

My invention is adapted to a different class of uses from a hay-loader, and could not be used for such a purpose, neither could the patent above referred to be used, like mine, to raise ice and such articles.

I do not claim a fork-head with an arched guide, in combination with the hinged clasps, having cross-bars attached thereto, stems and a socket, as arranged in the patent above referred to.

What I claim as my invention, and desire to secure by Letters Patent, is—

The grappling-hook, as described, combining the rod $c$, cross-bar $a$, arms $h\ h$, hooked arms $f f$, all arranged to operate as described.

E. J. RIKER.

Witnesses:
 WM. H. CLIFFORD,
 HENRY C. HOUSTON.